United States Patent [19]

Martin

[11] Patent Number: 4,556,581
[45] Date of Patent: Dec. 3, 1985

[54] METHOD OF MANUFACTURING AN INSULANT HAVING A SELF RETICULATING CELLULAR STRUCTURE

[75] Inventor: Jean Marcel Martin, Grigny, France

[73] Assignee: Les Cables de Lyon, Clichy, France

[21] Appl. No.: 678,185

[22] Filed: Dec. 4, 1984

[30] Foreign Application Priority Data

Dec. 5, 1983 [FR] France ............................. 83 19404

[51] Int. Cl.⁴ .............................................. B05D 1/22
[52] U.S. Cl. ....................................... 427/29; 427/32;
427/119; 427/120; 427/185; 427/195; 427/201
[58] Field of Search .................... 427/29, 32, 119, 120, 427/185, 195, 201

[56] References Cited

U.S. PATENT DOCUMENTS 4,104,416  8/1978  Parthasarathy et al. ............. 427/32
4,297,386 10/1981  Gillette ................................ 427/32

Primary Examiner—Richard Bueker
Attorney, Agent, or Firm—Sughrue, Mion, Zinn, Macpeak & Seas

[57] ABSTRACT

A method of manufacturing an insulant having a self reticulating structure for an electrical cable including at least one bare wire (1) obtained from a wire-drawing machine (10), the method comprising:

using grafted polyethylene which is finely crushed or which is obtained in powder form;

finely crushing gypsum to act as an expansion agent and as a reticulation catalyst;

mixing the polyethylene and the gypsum without kneading; and making a fluidized bed or an electrostatic suspension of the resulting mixture and passing a bare wire through the resulting fluidized or suspended mixture while the wire is at high temperature at the outlet from the wire-drawing machine, the temperature being in the range 200° C. to 350° C.

2 Claims, 1 Drawing Figure

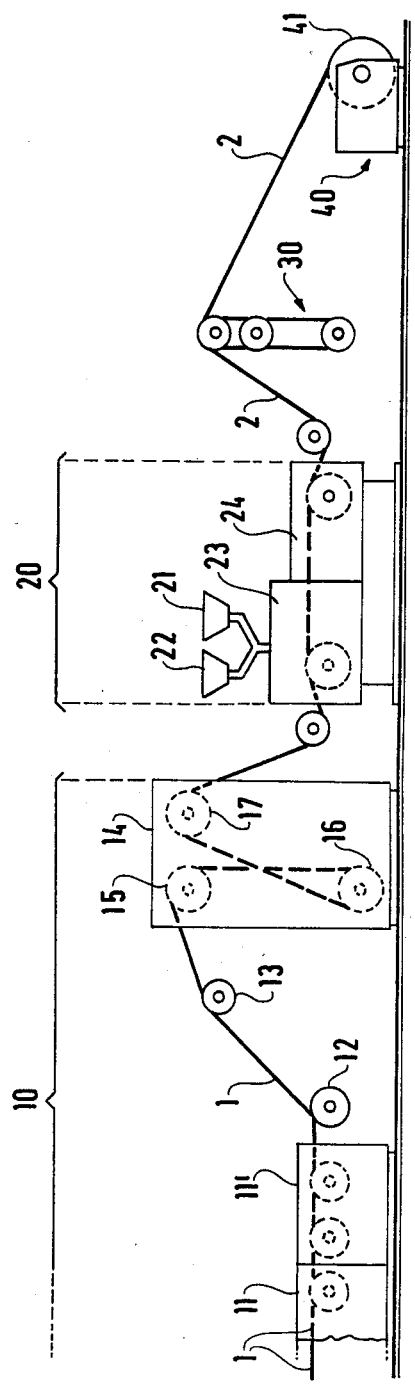

METHOD OF MANUFACTURING AN INSULANT HAVING A SELF RETICULATING CELLULAR STRUCTURE

The present invention relates to a method of manufacturing an insulant having a self reticulating cellular structure for an electrical cable including at least one bare conductor obtained from a wire-drawing machine.

BACKGROUND OF THE INVENTION

The current technique of insulating low voltage power cables and telecommunications cables as used by practically all cable manufacturers, is the extrusion technique which consists in insulating an electrical conductor coming from a wire-drawing machine by passing it through an extruder.

However, the speed at which a conductor can pass through an extruder is limited, and consequently the speed at which cable can be manufactured is limited.

The present invention makes it possible to do without the extruder, and the cable manufacturing speed is thus the speed at which the wire-drawing machine can deliver wire. For example, an extruder limits the speed to about 10 m/s (meters per second), while a wire-drawing machine can reach a speed of about 40 m/s.

The present invention also makes it possible to insulate an electrical conductor in a single operation directly at the outlet from the wire-drawing machine by means of a cellular insulant having good mechanical properties unlike cellular insulants currently obtained by extrusion which are soft and likely to melt.

SUMMARY OF THE INVENTION

The present invention provides a method of manufacturing an insulant having a self reticulating structure for an electrical cable including at least one bare wire obtained from a wire-drawing machine, the method comprising:

using grafted polyethylene which is finely crushed or which is obtained in powder form;

finely crushing gypsum to act as an expansion agent and as a reticulation catalyst;

mixing the polyethylene and the gypsum without kneading; and making a fluidized bed or an electrostatic suspension of the resulting mixture and passing a bare wire through the resulting fluidized or suspended mixture while the wire is at high temperature at the outlet from the wire-drawing machine, the temperature being in the range 200° C. to 350° C.

Preferably, a master catalyst for reticulating grafted polyethylene is incorporated in the mixture in order to greatly accelerate the speed of reticulation, the catalyst being an organic tin compound, eg. dibutyl tin dilaurate. The catalyst should be about 0.05% to 2.0% for 100% polyethylene.

BRIEF DESCRIPTION OF THE DRAWING

An implementation of the invention is described by way of example with reference to the sole FIGURE of the accompanying drawing, which is a diagram of an installation for manufacturing an insulated electric wire.

MORE DETAILED DESCRIPTION

A wire-drawing machine 10 comprises a plurality of drawing stages, with two units 11 and 11' being shown, followed by draw wheels 12 and 13 and an annealing unit 14 having wheels 15, 16, 17 over which the wire passes. The wire-drawing machine 10 is directly followed by an insulating unit 20, which is itself directly followed by a regulator 30 and a winder 40 including a storage drum 41.

The insulating unit 20 comprises two tanks 21 and 22 with the tank 21 containing grafted polyethylene, with or without a reticulation catalyst, and the tank 22 containing gypsum. Both tanks contain their respective materials in powder form, either directly obtained that way or after being reduced to powder form by means of respective crushers (not shown). Typically, the polyethylene grains should be in the range 20 $\mu$m to 400 $\mu$m, while the gypsum grains should be in the range 2 $\mu$m to 20 $\mu$m. The insulator unit also includes a fluidizing bed 23 for the said powders, and a cooler 24.

The insulation is applied to the wire as follows:

Bare conductor 1 comes from the annealer 14 where it is annealed at temperatures in the range 200° C. to 350° C. it passes through the fluidizing bed 23 where it is coated with the powdered polyethylene and gypsum which are mixed prior to being applied to the fluidizing bed 23. The mixture should contain about 2% to 10% gypsum for 100% polyethylene. On contact with the wire wire, the mixed powders melt, causing the gypsum to decompose and evolve water which makes cells in the melted polyethylene. The coated wire then passes through the cooler 24 and the water that has been evolved provokes the reticulation reaction by hydrolyzing silane. The reticulation takes place very rapidly when a reticulation catalyst is present, eg. an organic tin compound. The catalyst is not indispensible, but without it the reticulation would take longer.

The insulated cable 2 obtained at the outlet from the insulating unit 20 then passes round a regulator 30 and is stocked on a drum 41 driven by winding gear 40.

The above-described method of insulating bare wire may be applied to any type of low voltage or telecommunications wire, cntaining one or more conductors.

I claim:

1. A method of manufacturing an insulant having a self reticulating structure for an electrical cable including at least one bare wire obtained from a wire-drawing machine, the method comprising:

using grafted polyethylene which is finely crushed or which is obtained in powder form;

finely crushing gypsum to act as an expansion agent and as a reticulation catalyst;

mixing the polyethylene and the gypsum without kneading; and making a fluidized bed or an electrostatic suspension of the resulting mixture and passing a bare wire through the resulting fluidized or suspended mixture while the wire is at high temperature at the outlet from the wire-drawing machine, the temperature being in the range 200° C. to 350° C.

2. A method according to claim 1, wherein a master catalyst for reticulating grafted polyethylene is incorporated in the mixture in order to greatly accelerate the speed of reticulation, the catalyst being an organic tin compound, eg. dibutyl tin dilaurate.

* * * * *